(12) United States Patent
Nishigata

(10) Patent No.: US 8,063,514 B2
(45) Date of Patent: Nov. 22, 2011

(54) POWER SUPPLY SELECTION/DETECTION CIRCUIT

(75) Inventor: Yoshitaka Nishigata, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 619 days.

(21) Appl. No.: 11/708,563

(22) Filed: Feb. 21, 2007

(65) Prior Publication Data

US 2007/0204178 A1 Aug. 30, 2007

(30) Foreign Application Priority Data

Feb. 24, 2006 (JP) ................................ 2006-048547

(51) Int. Cl.
*H01J 1/00* (2006.01)
(52) U.S. Cl. .......................................... 307/85; 307/87
(58) Field of Classification Search .................... 307/64, 307/85, 87; 327/407, 408; 361/103; 713/300
See application file for complete search history.

(56) References Cited

U.S. PATENT DOCUMENTS

| | | | | |
|---|---|---|---|---|
| 4,492,876 | A * | 1/1985 | Colbert et al. ................... | 307/66 |
| 7,024,569 | B1 * | 4/2006 | Wright et al. .................. | 713/300 |
| 7,525,291 | B1 * | 4/2009 | Ferguson ....................... | 320/164 |
| 2005/0063725 | A1 * | 3/2005 | Matsukura ...................... | 399/88 |

FOREIGN PATENT DOCUMENTS

| | | |
|---|---|---|
| JP | 11-252917 | 9/1999 |
| JP | 2000-284865 | 10/2000 |

OTHER PUBLICATIONS

Japanese Official Action—2006-048547—Aug. 2, 2011.

* cited by examiner

*Primary Examiner* — Jared Fureman
*Assistant Examiner* — Daniel Cavallari
(74) *Attorney, Agent, or Firm* — Young & Thompson

(57) ABSTRACT

A power supply selection/detection circuit to select one main power supply from a plurality of external power supplies includes a resistance element with one end connected to an external power supply and another end connected to the main power supply, a first voltage detector to receive a voltage of the external power supply and detect a voltage of the external power supply, a second voltage detector to detect a voltage between the ends of the resistance element, and a switch connected between the external power supply and a ground to short-circuit or open-circuit between the external power supply and the ground according to an output of the second voltage detector. The resistance element and the first voltage detector are disposed for each of the plurality of external power supplies, and the second voltage detector and the switch are disposed for at least one of the plurality of external power supplies.

8 Claims, 6 Drawing Sheets

RELATED ART

POWER SUPPLY SELECTION/DETECTION CIRCUIT

BACKGROUND OF THE INVENTION

1. Field of the Invention

The present invention relates to a power supply circuit of portable devices and, particularly, to a circuit of selecting and detecting a power supply.

2. Description of Related Art

Recent information technology devices are reduced in size, and mobile computers, digital cameras, and storage devices with high portability are developed to thereby enable information interchange with interconnection. Such portable devices are small sized to ensure portability, and therefore power is supplied through a power-suppliable interface connector such as an AC adapter or USB (Universal Serial Bus).

Such a power supply system is oft-en designed to, for example, place high priority on a power supply, if any, from a power supply source dedicated to providing a power supply only such as an AC adapter in order to minimize the power consumption of a battery of a host computer or the like which is connected through an interface connector. For instance, a circuit to detect and select a power supply is placed between a portable device and a power supply source. Power supply selection/detection circuits according to related arts are described hereinafter.

FIG. 5 is a block diagram of a power supply selection/detection circuit according to a relate art. In the power supply selection/detection circuit 500, a voltage supplied from a power supply 511 or a power supply 521 is applied to a load 501 through a main power supply 502. The power supply selection/detection circuit 500 includes a power supply detector 510 disposed between the power supply 511 and the main power supply 502, and a power supply detector 520 disposed between the power supply 521 and the main power supply 502. The power supply detector 510 includes a Schottky diode 512, a voltage comparator 513, and two resistors 514 and 515. The power supply detector 520 includes a Schottky diode 522, a voltage comparator 523, and two resistors 524 and 525.

The anode of the Schottky diode 512 is connected to the power supply 511, and the cathode of the Schottky diode 512 is connected to the main power supply 502. The voltage comparator 513 detects the voltage of the power supply 511 to determine the presence or absence of the power supply 511. The voltage comparator 513 receives a reference power supply voltage Va1 and a voltage Va2 at a node between the resistors 514 and 515 that divide by resistance the power supply 511. The anode of the Schottky diode 522 is connected to the power supply 521, and the cathode of the Schottky diode 522 is connected to the main power supply 502. The voltage comparator 523 detects if power is supplied through the power supply 521. One input terminal of the voltage comparator 523 receives a reference power supply voltage Vb1, and the other input terminal of the voltage comparator 523 receives a voltage Vb2 at a node between the resistors 524 and 525 that divide by resistance the power supply 521.

In this example, the power supply 511 is described as an AC adapter and the power supply 521 as an USB connector, for example. Thus, when power is supplied from an AC adapter, power supply from an interface is shut off, for instance. The operation of the power supply selection/detection circuit 500 when the voltage supplied from the AC adapter is higher than the voltage supplied from the USB connector, which is when the power supply 511 is higher than the power supply 521, is described hereinafter. The voltage comparator 513 compares the reference voltage Va1 with the voltage Va2 at the node between the resistors 514 and 515 to detect that the power supply 511 is supplied. On the other hand, the voltage comparator 523 compares the reference voltage Vb1 with the voltage Vb2 at the node between the resistors 524 and 525 to detect if the power supply 521 is supplied. If the power supply 521 is lower than the power supply 511, the voltage from the power supply 511 is supplied preferentially.

The operation of the power supply selection/detection circuit 500 when only the power supply voltage from the AC adapter is connected, which is when only the power supply 511 is connected, is described hereinafter. The voltage comparator 513 compares the reference voltage Va1 with the voltage Va2 at the node between the resistors 514 and 515 to detect that the power supply 511 is being supplied. On the other hand, reverse leakage current Ir from the main power supply 502 flows to the Schottky diode 522. Although diodes ideally transmit current in one direction only, backward current flows slightly in practice. Accordingly, the voltage Vb2 occurs at the node between the resistors 524 and 525. If the voltage Vb2 at the node is not lower than the reference voltage Vb1, the voltage comparator 523 falsely detects that power is being supplied through the power supply 521. It is therefore necessary to set low values to the resistors 524 and 525.

Another example of a power supply selection/detection circuit is disclosed in Japanese Unexamined Patent Application Publication No. 2000-284865. FIG. 6 is a block diagram of a power supply selection/detection circuit disclosed therein. The power supply selection/detection circuit illustrated in FIG. 6 includes a power supply line 1 to supply power from an interface such as USB and a power supply line 2 to supply power from an AC adapter. In this circuit also, power supply from the interface is shut off when power is supplied from the AC adapter. Thus, if the voltage of the power supply line 2 increases, the current flows into the ground through a Zener diode 10. Accordingly, the base voltage of a transistor 17 increases due to the IR drop across a resistor 12 to turn on the transistor 17. The base voltage of a transistor 18 thereby decreases to turn off the transistor 18, which then turns off a transistor 20. As a result, the power supply from the interface is shut off.

However, the inventor of the present invention has found that the above-described related arts have the following problems. In the power supply selection/detection circuit 500 illustrated in FIG. 5, if the voltage supplied from the power supply 511 is higher than the voltage supplied from the power supply 521, current flows to the resistors 524 and 525 which are connected to the voltage comparator 523. This raises the problem that current consumption occurs in the power supply detector 520 that is related to the power supply 521 which is not connected with the main power supply 502. Although the consumption current can be reduced by increasing the resistance of the resistors 524 and 525, this causes another problem. For example, if the voltage is supplied from the power supply 511 only, the reverse leakage current Ir from the main power supply 502 flows to the Schottky diode 522, and the voltage Vb2 occurs at the node between the resistors 524 and 525. Thus, if the voltage Vb2 at the node is not lower than the reference voltage Vb1, the voltage comparator 523 can falsely detect that power is being supplied through the power supply 521.

To avoid this, if the resistance of the resistor 525 is Rb2, the reverse leakage current of the Schottky diode is Ir, the reference voltage of the voltage comparator 523 is Vb1, it is necessary to set the resistance of the resistor 525 to satisfy the expression: Rb2*Ir<Vb1, and therefore the resistance of the resistor 525 cannot be set high enough. This raises the problem that the current consumed in the power supply detector 520 cannot be reduced when power is supplied from the power supply 511 to the main power supply 502. This not only increases the power consumption in the circuit in the standby mode but also fails to satisfy the current limit Imax of an USB connector in suspend mode if the power supply 521 is a USB connector.

The similar problem occurs in the configuration of the power supply selection/detection circuit illustrated in FIG. 6. Because current keeps flowing through the resistors 11 and 12 while the AC adapter is connected, power consumption occurs in a voltage detector 5. Although the consumption current can be reduced by increasing the resistance of the resistors 11 and 12, this causes another problem. Specifically, diodes 8 and 9 are placed respectively on the power supply lines 1 and 2 to prevent current backflow. Although the diodes ideally transmit current in one direction only, backward current flows slightly in practice. For example, if power is supplied through the power supply line 1, the backward current occurs in the diode 9 and flows into the ground through the resistors 11 and 12. Then, even though no power is supplied through the power supply line 2, the base voltage of the transistor 17 increases due to the IR drop across the resistor 12. This turns off the transistor 18 and further turns off the transistor 20; as a result, the power supply from the power supply line 2 is shut off. To avoid this, the resistance of the resistor 12 cannot be set high enough. Consequently, the current consumed in the power supply selection/detection circuit cannot be reduced.

SUMMARY OF THE INVENTION

According to one aspect of the present invention, there is provided a power supply selection/detection circuit to select one main power supply from a plurality of external power supplies, including a resistance element with one end connected to an external power supply and another end connected to the main power supply, a first voltage detector to receive a voltage of the external power supply and detect a voltage of the external power supply, a second voltage detector to detect a voltage between the ends of the resistance element, and a switch connected between the external power supply and a ground to short-circuit or open-circuit between the external power supply and the ground according to an output of the second voltage detector. The resistance element and the first voltage detector are disposed for each of the plurality of external power supplies, and the second voltage detector and the switch are disposed for at least one of the plurality of external power supplies. Such a configuration prevents the first voltage detector from falsely detecting an external power supply voltage.

This configuration enables the resistance of a voltage-dividing resistor that divides by resistance an external power supply voltage to be set high, thereby allowing the provision of a power supply selection/detection circuit with reduced current consumption.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teaching of the present invention and that the invention is not limited to the embodiments illustrated for explanatory purposes.

First Embodiment

Exemplary embodiments of the present invention are described hereinafter. The following description and the attached drawings are appropriately shortened and simplified to clarify the explanation. Redundant description is omitted as needed to clarify the explanation.

Figure 1:
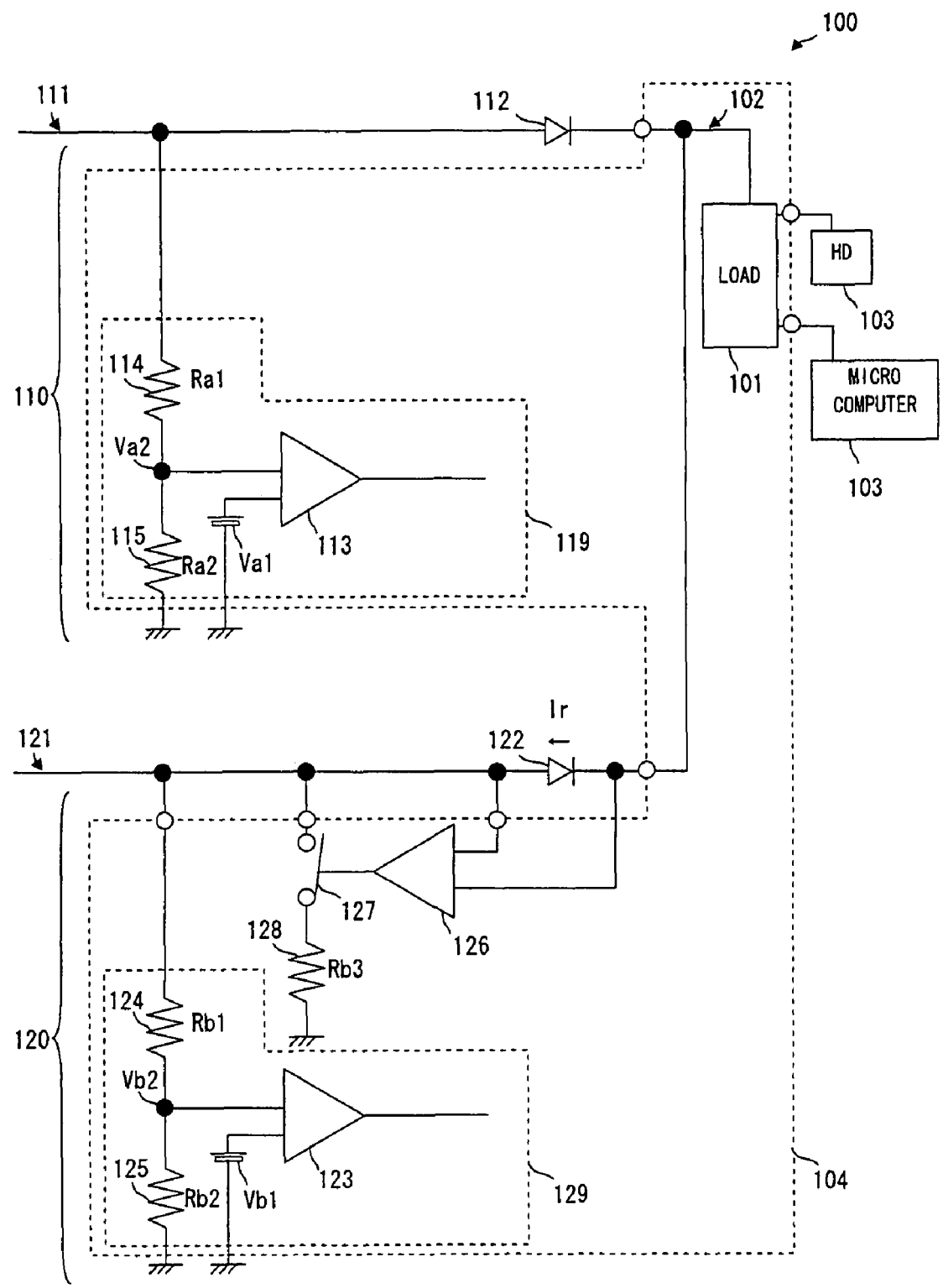
FIG. 1 shows the configuration of a power supply selection/detection circuit according to a first embodiment of the present invention.

A first embodiment of the present invention is described hereinafter with reference to the drawings. A power supply selection/detection circuit according to this embodiment is described, by way of illustration, as a circuit which includes, as a load, a driver of a hard disk drive or microcomputer of a portable device and which is formed on a semiconductor device such as an LSI (Large Scale Integration) circuit. FIG. 1 shows the configuration of a power supply selection/detection circuit according to the first embodiment.

Referring first to FIG. 1, in a power supply selection/detection circuit 100, the voltage supplied from a power supply 111 or a power supply 121 is applied to a load 101 through a main power supply 102. The power supply selection/detection circuit 100 includes a power supply detector 110 disposed between the power supply 111 and the main power supply 102, and a power supply detector 120 disposed between the power supply 121 and the main power supply 102. The power supply detector 110 includes a Schottky diode 112, a voltage comparator 113, and two resistors 114 and 115. The power supply detector 110 includes a voltage detector 119, which includes the voltage comparator 113 and the two resistors 114 and 115.

The power supply detector 120 includes a Schottky diode 122, two voltage comparators 123 and 126, three resistors 124, 125 and 128, and a switch 127. The power supply detector 120 includes a voltage detector 129, which includes the voltage comparator 123 and the resistors 124 and 125.

The power supply selection/detection circuit 100 supplies power to an external load 103 such as a hard disk drive or a microcomputer through a load 101 such as a DC/DC converter, LDO (Low Drop Out Regulator), or a battery charger. The power supply to the load 101 is not limited to the power supplies 111 and 121 and a plurality of power supplies may be added. The power, supply selection/detection circuit 100 excluding the Schottky diodes 112 and 122 may be formed integrally with an electric circuit of the load 101 on a semiconductor device 104 such as LSI. The resistors 114, 115, 124 and 125 may be connected outside the semiconductor device 104.

The anode of the Schottky diode 112 is connected to the power supply 111, and the cathode of the Schottky diode 112 is connected to the main power supply 102. The voltage comparator 113 detects the voltage of the power supply 111 to determine the presence or absence of the power supply 111. The voltage comparator 113 receives a reference power supply voltage Va1 and a voltage Va2 at a node between the resistors 114 and 115 that divide by resistance the power supply 111. The other end of the resistor 114 is connected to the power supply 111, and the other end of the resistor 115 is grounded.

The anode of the Schottky diode 122 is connected to the power supply 121, and the cathode of the Schottky diode 122 is connected to the main power supply 102. The input terminals of the voltage comparator 126 are respectively connected to the power supply 121 on the anode side of the Schottky diode 122 and the main power supply 102 on the cathode side of the Schottky diode 122 so as to compare a voltage difference between the power supply 121 and the main power supply 102. The output terminal of the voltage comparator 126 is connected to the switch 127. One end of the switch 127 is connected to the power supply 121, and the other end is grounded through the resistor 128. The resistor 128 may be placed between the switch 127 and the power supply 121. The voltage comparator 123 detects the voltage of the power supply 121 to determine the presence or absence of the power supply 121. The voltage comparator 123 receives a reference power supply voltage Vb1 and a voltage Vb2 at a node between the resistors 124 and 125 that divide by resistance the power supply 121. The other end of the resistor 124 is connected to the power supply 121, and the other end of the resistor 125 is grounded.

The switch 127 is short-circuited or open-circuited according to the output from the voltage comparator 126 based on the comparison between the voltage at the anode of the Schottky diode 122 and the voltage at the cathode of the Schottky diode 122. Specifically, if the voltage of the power supply 121 is lower than the voltage of the main power supply 102 (including when the power supply 121 is not inserted), the switch 127 is short-circuited. If, on the other hand, the voltage of the power supply 121 is higher than the voltage of the main power supply 102, the switch 127 is open-circuited.

The resistor 128 connected to the switch 127 has sufficiently low resistance with respect to the resistors 124 and 125 that serve as voltage-dividing resistors for the power supply 121. The resistor 128 is placed to deal with the Schottky diode reverse leakage current Ir, and if the reverse leakage current Ir is 120 μA or less, it is preferred that the resistance Rb1 of the resistor 124 is 750 KΩ±20%, the resistance Rb2 of the resistor 125 is 250 KΩ±20%, and the resistance Rb3 of the resistor 128 is 7.5 KΩ±20%.

The operation of the power supply selection/detection circuit 100 is described hereinafter with reference to FIG. 1. In this embodiment, the power supply 111 is described as an AC adapter and the power supply 121 as an USB connector, for example. The operation of the power supply selection/detection circuit 100 when the voltage supplied from the AC adapter is higher than the voltage supplied from the USB connector, which is when the power supply 111 is higher than the power supply 121, is described firstly.

When a voltage is supplied to the power supply 111, the voltage of the main power supply 102 is a voltage (e.g. about 0.2V) that is lower than the voltage of the power supply 111 by the amount of the forward voltage drop VF of the Schottky diode 112 due to the PN junction in the Schottky diode 112. The voltage comparator 113 compares the reference voltage Va1 and the voltage Va2 at the node to thereby detect that power is being supplied to the power supply 111.

On the other hand, in the power supply detector 120, a voltage lower than that supplied to the power supply 111 is supplied to the power supply 121. The voltage of the power supply 121 is thereby lower than the voltage of the main power supply 102, so that the switch 127 is short-circuited according to the output of the voltage comparator 126. The voltage comparator 123 compares the reference voltage Vb1 and the voltage Vb2 at the node to thereby determine the presence or absence of the power supply 121.

Referring still to FIG. 1, the operation of the power supply selection/detection circuit 100 when only the power supply voltage from the AC adapter is connected, which is when only the power supply 111 is connected, is described hereinafter. When a voltage is supplied to the power supply 111, the voltage of the main power supply 102 is a voltage that is lower than the voltage of the power supply 111 by the amount of VF of the Schottky diode 112 due to the PN junction in the Schottky diode 112. The voltage comparator 113 compares the reference voltage Va1 and the voltage Va2 at the node to thereby detect that power is being supplied to the power supply 111.

On the other hand, in the power supply detector 120, no voltage is supplied to the power supply 121. The voltage of the power supply 121 is thereby lower than the voltage of the main power supply 102, so that the switch 127 is short-circuited according to the output of the voltage comparator 126. The voltage comparator 123 compares the reference voltage Vb1 and the voltage Vb2 at the node to thereby determine that there is no power supply 121.

The reverse leakage current Ir from the main power supply 102 flows into the Schottky diode 122. The resistor 128 connected to the switch 127 has sufficiently low resistance with respect to the resistors 124 and 125. Accordingly, the reverse leakage current Ir flows into the resistor 128 through the short-circuited switch 127. This prevents the reverse leakage current Ir from flowing into the node between the resistors 124 and 125. Therefore, the voltage Vb2 at the node does not exceed the reference voltage Vb1, thereby avoiding the false detection in the voltage comparator 123.

If the power supply 111 is an AC adapter that is a dedicated line for power supply, it is possible to form a circuit that preferentially supplies the power from the power supply 111 to the main power supply 102 when power is connected to the power supply 111. For example, in the power supply selection/detection circuit 100 illustrated in FIG. 2, a transistor 203 is connected between the cathode of the Schottky diode 122 and the main power supply 102. The gate terminal of the transistor 203 is connected to the output terminal of the voltage comparator 113 of the power supply detector 110. In this configuration, the transistor 203 opens and closes according to the output from the voltage comparator 113 and, if power is connected to the power supply 111, the power from the power supply 111 is supplied preferentially. The polarity of the transistor 203 may be N-channel or P-channel. Further, a resistor 202 to be used for current detection or the like may be placed on the cathode side of the Schottky diode 122. Preferably, one end of the resistor 202 is connected to the cathode of the Schottky diode 122, and the other end of the resistor 202 is connected to the transistor 203.

Figure 2:
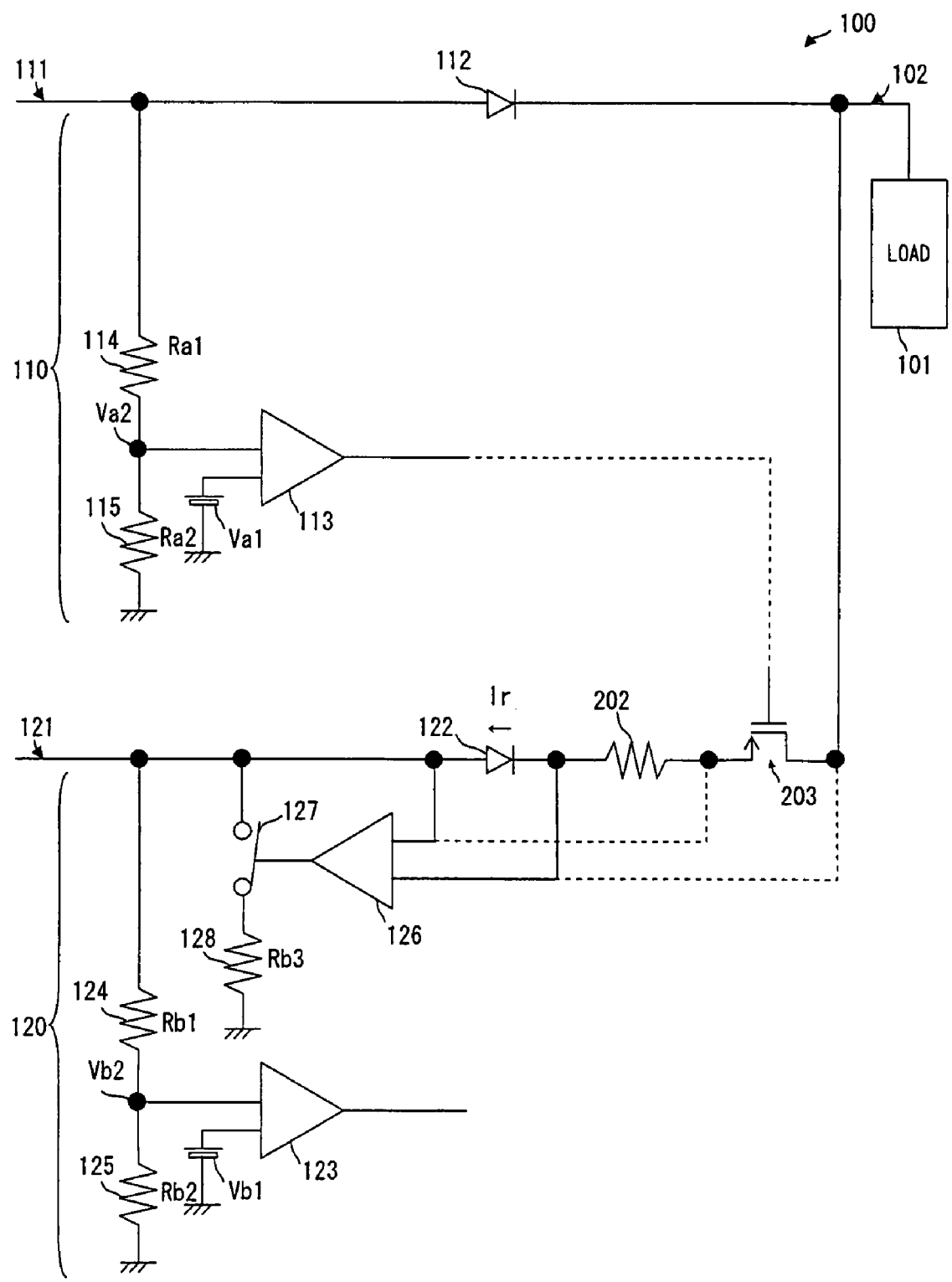
FIG. 2 shows the detailed configuration of a power supply selection/detection circuit according to the first embodiment of the present invention.

Although the voltage comparator 126 detects the presence of absence of an external power supply using a voltage difference after the VF drop due to the PN junction in the Schottky diode 122, it is possible to use a voltage difference between the both ends of the resistor 202 or a voltage difference between the terminals of the transistor 203 shown in FIG. 2. It is also possible to use a voltage difference between the Schottky diode 122 and the resistor 202, a voltage difference between the resistor 202 and the transistor 203, or a voltage difference between the Schottky diode 122 and the transistor 203.

As described above, it is possible to prevent the reverse leakage current Ir of the Schottky diode 122 from flowing into the resistors 124 and 125 by the switch 127 which opens and closes according to a voltage difference between the anode and the cathode of the Schottky diode 122 and the resistor 128. Because the reverse leakage current Ir does not flow into the node between the resistors 124 and 125, the voltage comparator 123 does not falsely detect that a voltage is being supplied to the power supply 121. The resistance of the resistors 124 and 125 can be therefore set high, which enables the reduction of the current consumed in the resistors 124 and 125. This reduces the power consumption in the power supply detector 120 in the standby mode or suspend mode that is related to the power supply 121 which is not connected with the main power supply 102.

The case where there is a limit to the current of the power supply 121 in the standby mode or suspend mode is described hereinbelow. If the resistance of the resistor 124 is Rb1, the resistance of the resistor 125 is Rb2, the current limit of the power supply 121 in the standby or suspend mode is Imax, and the supply voltage of the power supply 121 is V, the resistance of the resistors 124 and 125 can be set to satisfy the equation: $V/Imax \geq (Rb1+Rb2)$. Thus, the current limit can be satisfied by increasing the resistance of the resistors 124 and 125. This is particularly effective when the power supply 121 is a USB connector, for example.

To meet the standards of USB connectors, if a supply voltage is 4.3 to 5.4 V and a current limit Imax is 500 μA, the value of Rb1+Rb2 is preferably 8.6 to 10.8 KΩ or higher to satisfy the expression $V/Imax \geq (Rb1+Rb2)$. However, the circuit to which the USB connector supplies a voltage during the suspend mode is not only the power supply selection/detection circuit. Accordingly, the value of Rb1+Rb2 is preferably 43 to 54 KΩ or higher (Imax is 100 μA or, less) and more preferably 1 MΩ or higher (Imax is 4.3 to 5.4 μA or less).

Second Embodiment

Figure 3:
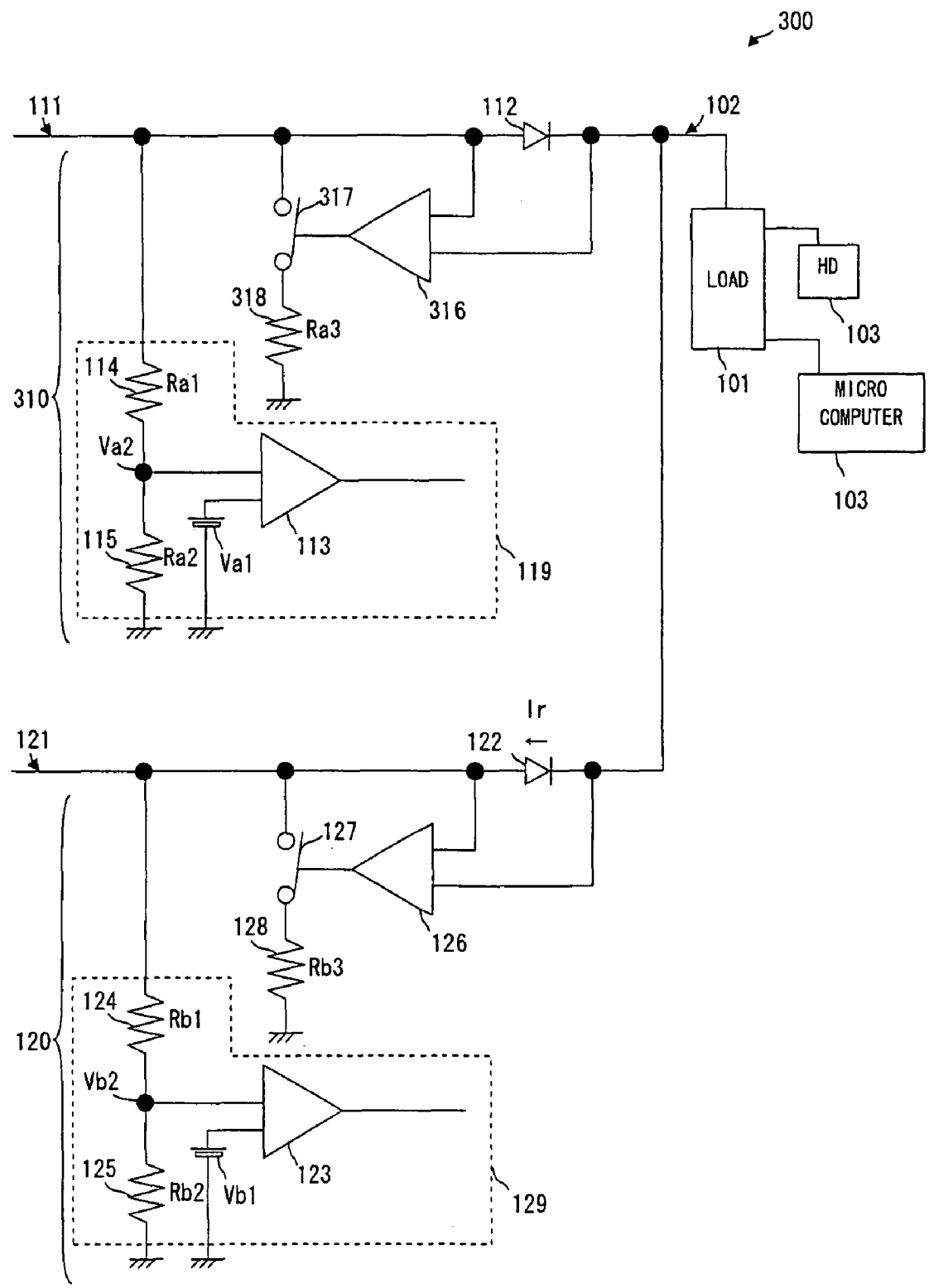
FIG. 3 shows the configuration of a power supply selection/detection circuit according to a second embodiment of the present invention.

A second embodiment of the present invention is described hereinafter with reference to the drawings. In the second embodiment, as in the first embodiment, a power supply selection/detection circuit is described, by way of illustration, as a circuit which includes, as a load, a driver of a hard disk drive or microcomputer of a portable device and which is formed on a semiconductor device such as an LSI. FIG. 3 shows the configuration of the power supply selection/detection circuit according to the second embodiment. The same circuit elements or operating principles as in the first embodiment are not described herein.

Referring to FIG. 3, in a power supply selection/detection circuit 300, the voltage supplied from the power supply 111 or the power supply 121 is applied to the load 101 through the main power supply 102. The power supply selection/detection circuit 300 includes a power supply detector 310 disposed between the power supply 111 and the main power supply 102, and the power supply detector 120 disposed between the power supply 121 and the main power supply 102. The power supply detector 310 includes a voltage comparator 316, a resistor 318, and a switch 317. The other configuration is the same as that in the power supply selection/detection circuit 100 of the first embodiment.

The power supply selection/detection circuit 300 supplies power to the external load 103 such as a hard disk drive or a microcomputer through the load 101 such as a DC/DC converter, LDO, or a battery charger. As described in the first embodiment, the power supply to the load 101 is not limited to the power supplies 111 and 121 and a plurality of power supplies may be added. Further, as in the first embodiment, the power supply selection/detection circuit 300 excluding the Schottky diodes 112 and 122 may be formed integrally with an electric circuit of the load 101 on a semiconductor device such as LSI, and the resistors 114, 115, 124 and 125 may be connected outside the semiconductor device.

The anode of the Schottky diode 112 is connected to the power supply 111, and the cathode of the Schottky diode 112 is connected to the main power supply 102. The input terminal of the voltage comparator 316 is connected to the power supply 111 on the anode side of the Schottky diode 112, and the other input terminal of the voltage comparator 316 is connected to the main power supply 102 on the cathode side of the Schottky diode 112 so as to compare a voltage difference between the power supply 111 and the main power supply 102. The output terminal of the voltage comparator 316 is connected to the switch 317. One end of the switch 317 is connected to the power supply 111, and the other end is grounded through the resistor 318. The resistor 318 may be placed between the switch 317 and the power supply 111. The voltage comparator 113 detects the voltage of the power supply 111 to determine the presence or absence of the power supply 111. The voltage comparator 113 receives a reference power supply voltage Vb1 and a voltage Vb2 at a node between the resistors 114 and 115 that divide by resistance the power supply 111. The other end of the resistor 114 is connected to the power supply 111, and the other end of the resistor 115 is grounded.

The switch 317 is short-circuited or open-circuited according to the output from the voltage comparator 316 based on the comparison between the voltage at the anode of the Schottky diode 112 and the voltage at the cathode of the Schottky diode 112. Specifically, if the voltage of the power supply 111 is lower than the voltage of the main power supply 102 (including when the power supply 111 is not inserted), the switch 317 is short-circuited. If, on the other hand, the voltage of the power supply 111 is higher than the voltage of the main power supply 102, the switch 317 is open-circuited. The operation of the switch 127 is the same as that of the first embodiment.

The resistor 318 connected to the switch 317 has sufficiently low resistance with respect to the resistors 114 and 115 that serve as voltage-dividing resistors for the power supply 111. The resistor 318 is placed to deal with the reverse leakage current Ir of the Schottky diode, and if the reverse leakage current Ir is 120 μA or less, it is preferred that the resistance Ra1 of the resistor 114 is 750 KΩ±20%, the resistance Ra2 of the resistor 115 is 250 KΩ±20%, and the resistance Ra3 of the resistor 318 is 7.5 KΩ±20%.

The operation of the power supply selection/detection circuit 300 is described hereinafter with reference to FIG. 3. In this embodiment, the power supply 111 is described as an AC adapter and the power supply 121 as an USB connector, for example. The operation of the power supply selection/detection circuit 300 when the voltage supplied from the AC adapter is higher than the voltage supplied from the USB connector, which is when the power supply 111 is higher than the power supply 121, is described firstly.

When a voltage is supplied to the power supply 111, the voltage of the main power supply 102 is a voltage that is lower than the voltage of the power supply 111 by the amount of the VF of the Schottky diode 112 due to the PN junction in the Schottky diode 112. The voltage of the power supply 111 is thereby higher than the voltage of the main power supply 102, and the switch 317 is open-circuited according to the output from the voltage comparator 316. The voltage comparator 113 compares the reference voltage Va1 and the voltage Va2 at the node to thereby detect that power is being supplied to the power supply 111.

On the other hand, in the power supply detector 120, a voltage lower than that supplied to the power supply 111 is supplied to the power supply 121. The voltage of the power supply 121 is thereby lower than the voltage of the main power supply 102, so that the switch 127 is short-circuited according to the output of the voltage comparator 126. The voltage comparator 123 compares the reference voltage Vb1 and the voltage Vb2 at the node to thereby determine the presence or absence of the power supply 121.

Referring still to FIG. 3, the operation of the power supply selection/detection circuit 300 when only the power supply voltage from the AC adapter is connected, which is when only the power supply 111 is connected, is described hereinafter. When a voltage is supplied to the power supply 111, the voltage of the main power supply 102 is a voltage that is lower than the voltage of the power supply 111 by the amount of VF of the Schottky diode 112 due to the PN junction in the Schottky diode 112 in the power supply detector 310. Accordingly, the voltage of the power supply 111 is higher than the voltage of the main power supply 102, and the switch 317 is open-circuited according to the output from the voltage comparator 316. The voltage comparator 113 compares the reference voltage Va1 and the voltage Va2 at the node to thereby detect that power is being supplied to the power supply 111.

On the other hand, in the power supply detector 120, no voltage is supplied to the power supply 121. The voltage of the power supply 121 is thereby lower than the voltage of the main power supply 102, so that the switch 127 is short-circuited according to the output of the voltage comparator 126. The voltage comparator 123 compares the reference voltage Vb1 and the voltage Vb2 at the node to thereby determine that there is no power supply 121.

The reverse leakage current Ir from the main power supply 102 flows into the Schottky diode 122. The resistor 128 connected to the switch 127 has sufficiently low resistance with respect to the resistors 124 and 125. Accordingly, the reverse leakage current Ir flows into the resistor 128 through the short-circuited switch 127. This prevents the reverse leakage current Ir from flowing into the node between the resistors 124 and 125. Therefore, the voltage Vb2 at the node does not exceed the reference voltage Vb1, thereby avoiding the false detection in the voltage comparator 123.

The power supply selection/detection circuit 300 shown in FIG. 3 may include the transistor 203 shown in FIG. 2 (not shown in FIG. 3) between the Schottky diode 122 and the main power supply 102. In this configuration, if the power supply 111 is an AC adapter that is a dedicated line for power supply, it is possible to form a circuit that preferentially supplies the power from the power supply 111 to the main power supply 102 when power is connected to the power supply 111 as described in the first embodiment. The circuit of FIG. 3 may further include the resistor 202 shown in FIG. 2.

Although the voltage comparator 126 detects the presence or absence of an external power supply using a voltage difference after the VF drop due to the PN junction in the Schottky diode 122, it is possible to use a voltage difference between the both ends of the resistor (not shown) between the Schottky diode 122 and the main power supply 102, or a voltage difference between the terminals of the transistor (not shown). It is also possible to use a voltage difference between the Schottky diode 122 and the resistor, a voltage difference between the resistor and the transistor, or a voltage difference between the Schottky diode 122 and the transistor, as described in the first embodiment.

In this configuration, the second embodiment has the same advantage as the first embodiment.

Further, because the switch 317 is open-circuited in the power supply detector 310 related to the power supply 111 which is connected to the main power supply 102, no current flows into the voltage comparator 316 and the resistor 318. Accordingly, adding the voltage comparator 316, the resistor 318 and the switch 317 to the power supply detector 310 does not cause an increase in power consumption.

Third Embodiment

Figure 4:
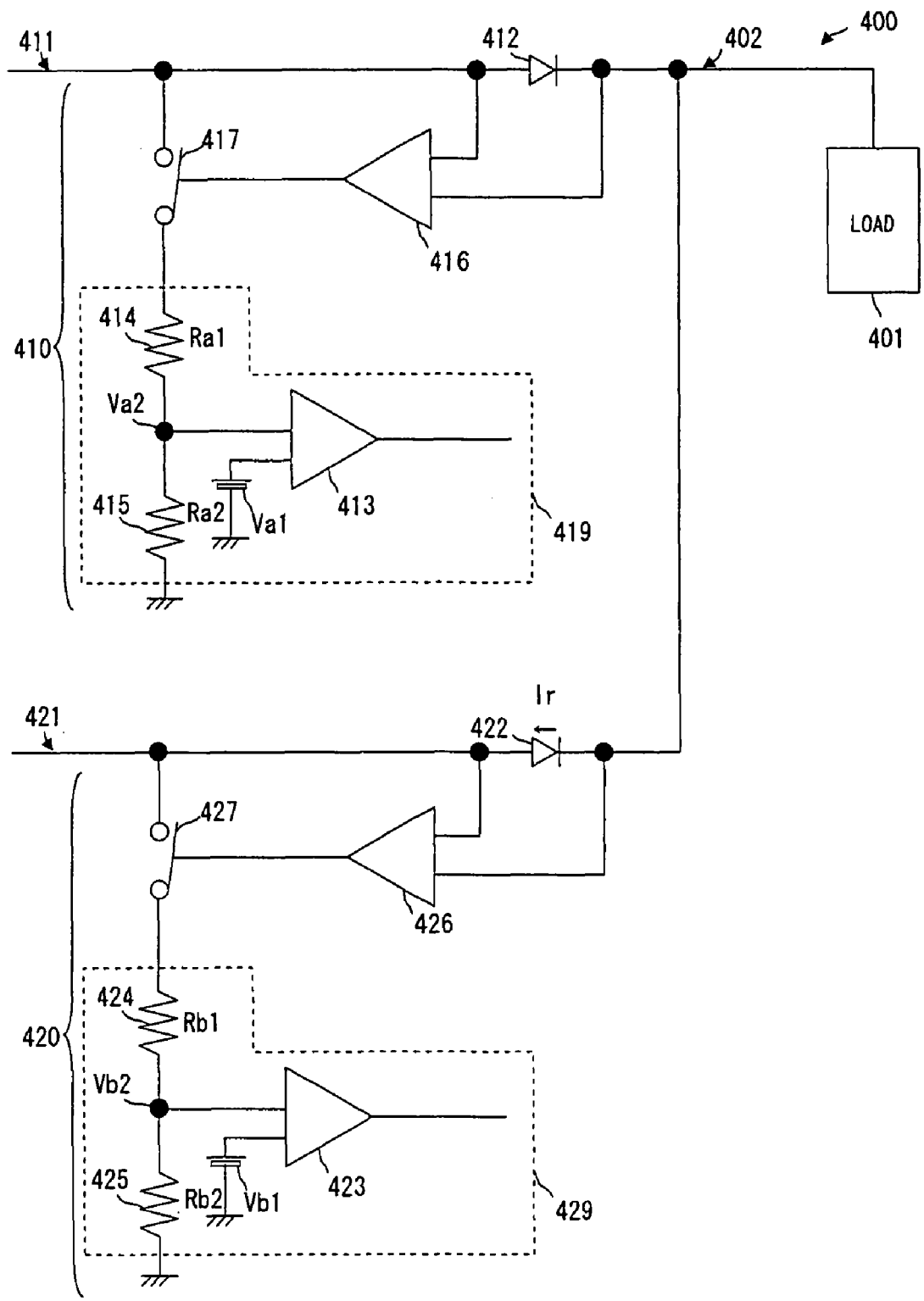
FIG. 4 shows the configuration of a power supply selection/detection circuit according to a third embodiment of the present invention.
Figure 5:
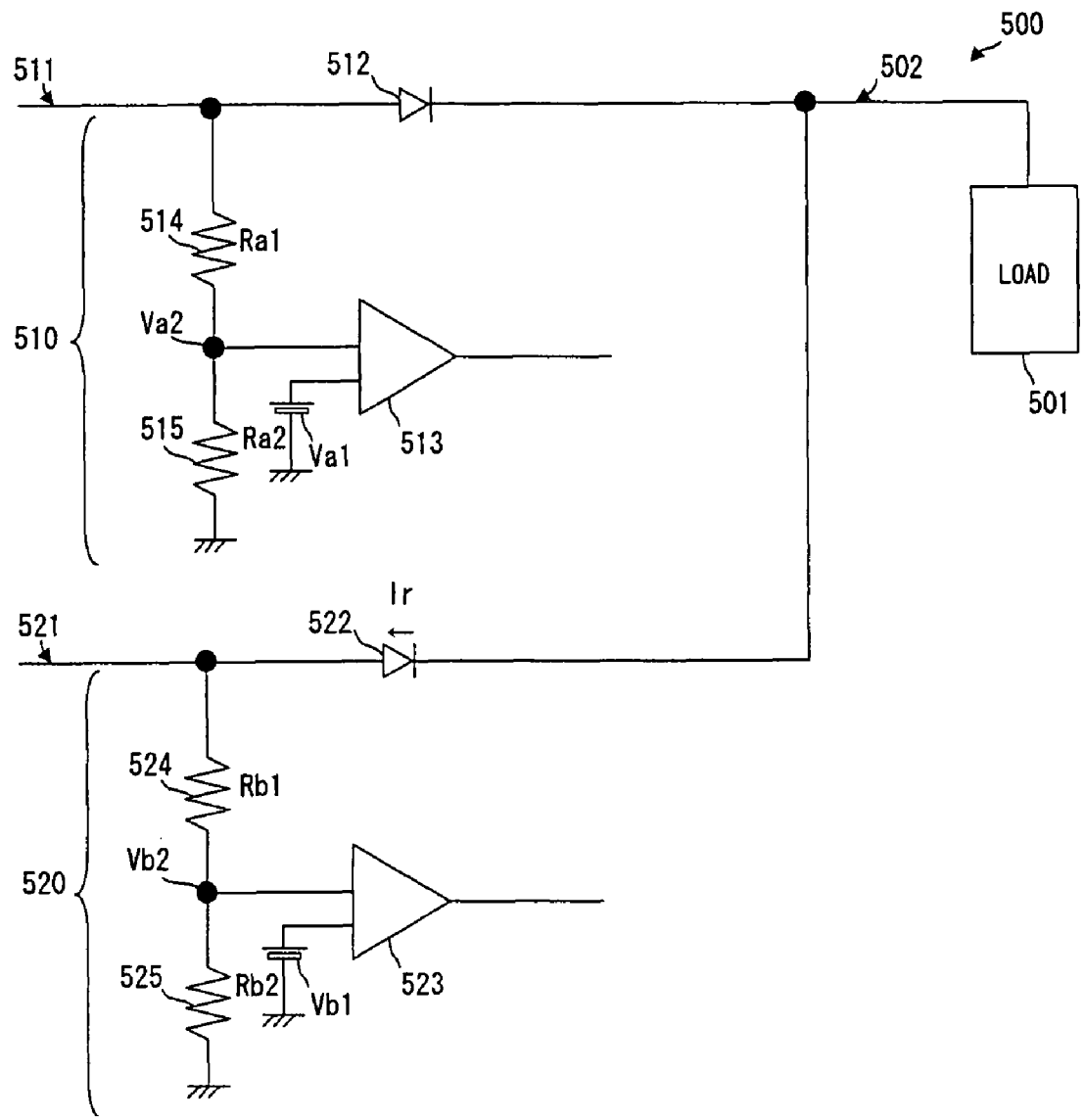
FIG. 5 shows the configuration of a power supply selection/detection circuit according to a related art.
Figure 6:
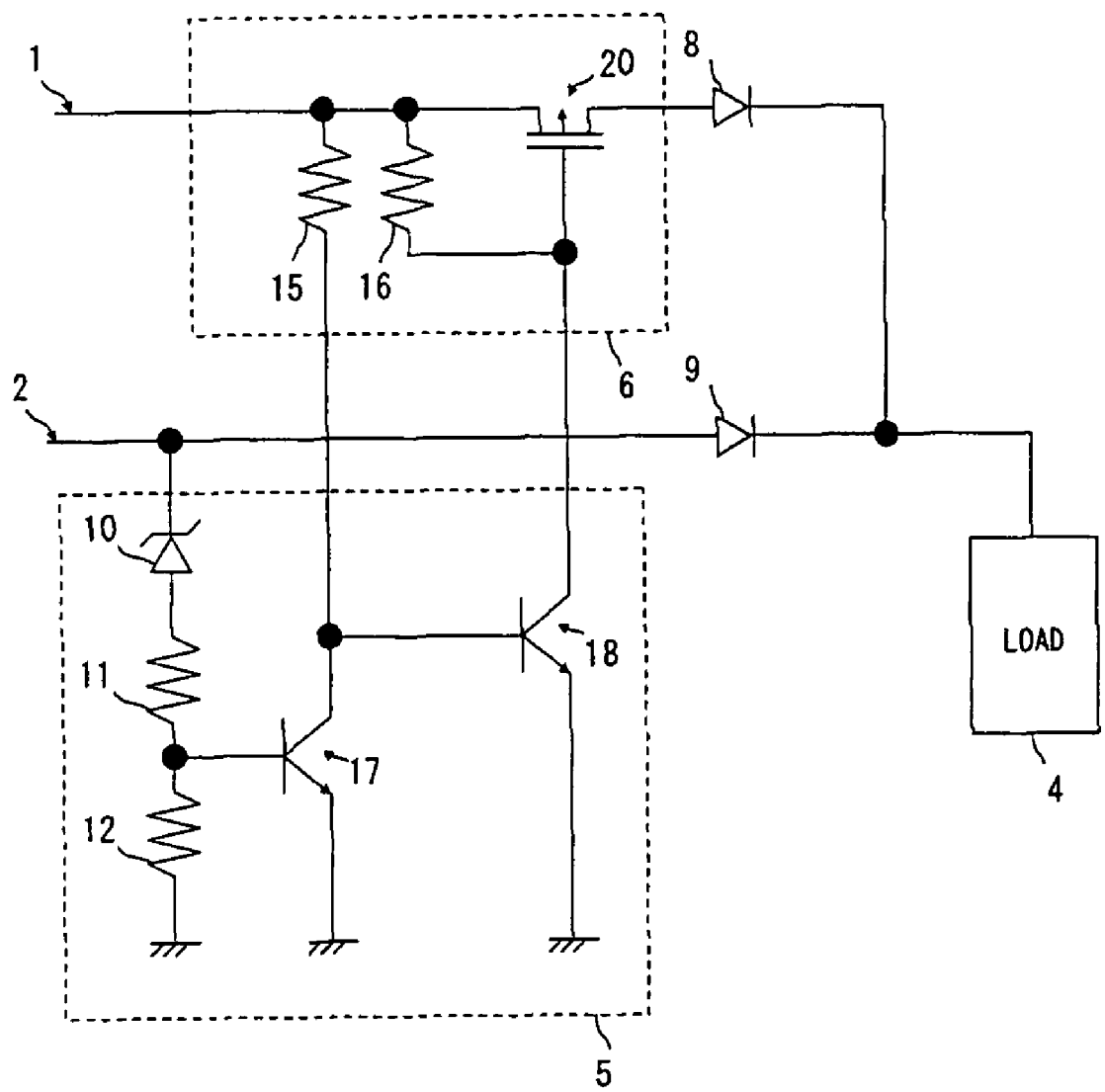
FIG. 6 shows the configuration of a power supply selection/detection circuit according to another related art.

A third embodiment of the present invention is described hereinafter with reference to the drawings. In the third embodiment, as in the first embodiment, a power supply selection/detection circuit is described, by way of illustration, as a circuit which includes, as a load, a driver of a hard disk drive or microcomputer of a portable device and which is formed on a semiconductor device such as an LSI. FIG. 4 shows the configuration of the power supply selection/detection circuit according to the third embodiment. The same circuit elements or operating principles as in the first embodiment are not described herein.

Referring to FIG. 4, in a power supply selection/detection circuit 400, the voltage supplied from a power supply 411 or a power supply 421 is applied to a load 401 through a main power supply 402. The power supply selection/detection circuit 400 includes a power supply detector 410 disposed between the power supply 411 and the main power supply 402, and a power supply detector 420 disposed between the power supply 421 and the main power supply 402. The power supply detector 410 includes a Schottky diode 412, two voltage comparators 413 and 416, two resistors 414 and 415, and a switch 417. The power supply detector 410 includes a voltage detector 419, which includes the voltage comparator 413 and the two resistors 414 and 415.

The power supply detector 420 includes a Schottky diode 422, two voltage comparators 423 and 426, and two resistors 424 and 425, and a switch 427. The power supply detector 420 includes a voltage detector 429, which includes the voltage comparator 423 and the resistors 424 and 425.

The power supply selection/detection circuit 400 supplies power to an external load (not shown) such as a hard disk drive or a microcomputer through the load 401 such as a DC/DC converter, LDO, or a battery charger as described in the first embodiment. The power supply to the load 401 is not limited to the power supplies 411 and 421 and a plurality of power supplies may be added. The power supply selection/detection circuit 400 excluding the Schottky diodes 412 and 422 may be formed integrally with an electric circuit of the load 401 on a semiconductor device such as LSI, and the resistors 414, 415, 424 and 425 may be connected outside the semiconductor device as described in the first embodiment.

The anode of the Schottky diode 412 is connected to the power supply 411, and the cathode of the Schottky diode 412 is connected to the main power supply 402. The voltage comparator 413 detects the voltage of the power supply 411 to determine the presence or absence of the power supply 411.

The voltage comparator 413 receives a reference power supply voltage Va1 and a voltage Va2 at a node between the resistors 414 and 415 that divide by resistance the power supply 411. The input terminal of the voltage comparator 416 is connected to the power supply 411 on the anode side of the Schottky diode 412, and the other input terminal of the voltage comparator 416 is connected to the main power supply 402 on the cathode side of the Schottky diode 412 so as to compare a voltage difference between the power supply 411 and the main power supply 402. The output terminal of the voltage comparator 416 is connected to the switch 417. One end of the switch 417 is connected to the power supply 411, and the other end of the switch 417 is connected to the resistor 414, the resistor 415, and then grounded. Although not shown, the switch 417 may be placed between the resistor 414 and the input terminal of the voltage comparator 413.

The anode of the Schottky diode 422 is connected to the power supply 421, and the cathode of the Schottky diode 422 is connected to the main power supply 402. The voltage comparator 423 detects the voltage of the power supply 421 to determine the presence or absence of the power supply 421. The voltage comparator 423 receives a reference power supply voltage Vb1 and a voltage Vb2 at a node between the resistors 424 and 425 that divide by resistance the power supply 421. The input terminal of the voltage comparator 426 is connected to the power supply 421 on the anode side of the Schottky diode 422, and the other input terminal of the voltage comparator 426 is connected to the main power supply 402 on the cathode side of the Schottky diode 422 so as to compare a voltage difference between the power supply 421 and the main power supply 402. The output terminal of the voltage comparator 426 is connected to the switch 427. One end of the switch 427 is connected to the power supply 421, and the other end of the switch 427 is connected to the resistor 424, the resistor 425, and then grounded. Although not shown, the switch 427 may be placed between the resistor 424 and the input terminal of the voltage comparator 423. Further, the switch 427 may be placed between the input terminal of the voltage comparator 423 and the resistor 425, or between the resistor 425 and the ground.

The switch 417 is short-circuited or open-circuited according to the output from the voltage comparator 416 based on the comparison between the voltage at the anode of the Schottky diode 412 and the voltage at the cathode of the Schottky diode 412. Specifically, if the voltage of the power supply 411 is lower than the voltage of the main power supply 402 (including when the power supply 411 is not inserted), the switch 417 is open-circuited. If, on the other hand, the voltage of the power supply 411 is higher than the voltage of the main power supply 402, the switch 417 is short-circuited.

The switch 427 is short-circuited or open-circuited according to the output from the voltage comparator 426 based on the comparison between the voltage at the anode of the Schottky diode 422 and the voltage at the cathode of the Schottky diode 422. Specifically, if the voltage of the power supply 421 is lower than the voltage of the main power supply 402 (including when the power supply 421 is not inserted), the switch 427 is open-circuited. If, on the other hand, the voltage of the power supply 421 is higher than the voltage of the main power supply 402, the switch 427 is short-circuited.

The operation of the power supply selection/detection circuit 400 is described hereinafter with reference to FIG. 4. In this embodiment, the power supply 411 is described as an AC adapter and the power supply 421 as an USB connector, for example. The operation of the power supply selection/detection circuit 400 when the voltage supplied from the AC adapter is higher than the voltage supplied from the USB connector, which is when the power supply 411 is higher than the power supply 421, is described firstly.

When a voltage is supplied to the power supply 411, the voltage of the main power supply 402 is a voltage that is lower than the voltage of the power supply 411 by the amount of the VF of the Schottky diode 412 due to the PN junction in the Schottky diode 412. The voltage of the power supply 411 is thereby higher than the voltage of the main power supply 402, and the switch 417 is short-circuited according to the output from the voltage comparator 416. Accordingly, current flows from the power supply 411 to the ground through the resistors 414 and 415. The voltage Va2 at the node is thereby higher than the reference voltage Va1, and the voltage comparator 413 detects that power is being supplied to the power supply 411.

On the other hand, in the power supply detector 420, a voltage lower than that supplied to the power supply 411 is supplied to the power supply 421. The voltage of the power supply 421 is thereby lower than the voltage of the main power supply 402, so that the switch 427 is open-circuited according to the output of the voltage comparator 426. Accordingly, the voltage Va2 at the node does not increase but stays at the ground level, and thereby the power supply detector 420 does not detect that power is being supplied to the power supply 421 based on the comparison result in the voltage comparator 423. If the switch 427 is placed between the voltage comparator 423 and the ground, though not shown, the voltage Vb2 at the node is fixed to about a power supply voltage level while the switch 427 is open-circuited. Thus, the power supply detector 420 can invert the logic of the voltage comparator 423 so as not to detect that power is being supplied to the power supply 421.

The operation of the power supply selection/detection circuit 400 when only the power supply voltage from the AC adapter is connected, which is when only the power supply 411 is connected, is described hereinafter. When a voltage is supplied to the power supply 411, the voltage of the main power supply 402 is a voltage that is lower than the voltage of the power supply 411 by the amount of VF of the Schottky diode 412 due to the PN junction in the Schottky diode 412 in the power supply detector 410. Accordingly, the voltage of the power supply 411 is higher than the voltage of the main power supply 402, and the switch 417 is short-circuited according to the output from the voltage comparator 416. Accordingly, current flows from the power supply 411 to the ground through the resistors 414 and 415. The voltage Va2 at the node is thereby higher than the reference voltage Va1, and the voltage comparator 413 detects that power is being supplied to the power supply 411 in the power supply detector 410.

On the other hand, in the power supply detector 420, no voltage is supplied to the power supply 421. The voltage of the power supply 421 is thereby lower than the voltage of the main power supply 402, so that the switch 427 is open-circuited according to the output of the voltage comparator 426. Accordingly, the voltage Va2 at the node does not increase but stays at the ground level, so that the power supply detector 420 does not detect that power is being supplied to the power supply 421 based on the comparison result in the voltage comparator 423. If the switch 427 is placed between the voltage comparator 423 and the ground, though not shown, the voltage Va2 at the node is fixed to about a power supply voltage level while the switch 427 is open-circuited. Thus, the power supply detector 420 can invert the logic of the voltage comparator 423 so as not to detect that power is being supplied to the power supply 421.

Reverse leakage current Ir from the main power supply 402 flows into the Schottky diode 422. However, because the switch 427 is open-circuited, the reverse leakage current Ir does not flows into the node between the resistors 424 and 425. Therefore, the voltage Vb2 at the node does not exceed the reference voltage Vb1, thereby avoiding the false detection in the voltage comparator 423.

The power supply selection/detection circuit 400 shown in FIG. 4 may include the transistor 203 and the resistor 202 shown in FIG. 2 (not shown in FIG. 4) between the Schottky diode 422 and the main power supply 402. In this configuration, the voltage comparator 426 can determine the presence or absence of an external power supply using not only a voltage difference after the VF drop due to the PN junction in the Schottky diode 422, but also a voltage difference between the both ends of the resistor or a voltage difference between the terminals of the transistor. It is also possible to use a voltage difference between the Schottky diode 422 and the resistor, a voltage difference between the resistor and the transistor, or a voltage difference between the Schottky diode 422 and the transistor, as described in the first embodiment.

As described above, it is possible to prevent the reverse leakage current Ir of the Schottky diode 422 from flowing into the resistors 424 and 425 by the switch 427 which opens and closes according to a voltage difference between the anode and the cathode of the Schottky diode 422. Because the reverse leakage current Ir does not flow into the node between the resistors 424 and 425, the voltage comparator 423 does not falsely detect that a voltage is being supplied to the power supply 421. The resistance of the resistors 424 and 425 can be therefore set high, which enables the reduction of the current consumed in the resistors 424 and 425. This reduces the power consumption in the power supply detector 420 in the standby mode or suspend made that is related to the power supply 421 which is not connected with the main power supply 402.

Similarly, the configuration allows the resistance of the resistors 414 and 415 to be set high, which enables the reduction of the current flowing into the resistors 414 and 415 while the power supply 411 is connected to the main power supply 402. As a result, power consumption can be reduced in the power supply detector 410 related to the power supply 411 which is connected with the main power supply 402 as well.

If the resistance of the resistors 414 and 424 and the resistance of the resistors 415 and 425 when there is a limit to the current of the power supplies 411 and 421 in the standby or suspend mode are Rb1 and Rb2, respectively, the current limit of the power supplies 411 and 421 in the standby or suspend mode is Imax, and the supply voltage of the power supplies 411 and 421 is V, $V/Imax \geq (Rb1+Rb2)$. The resistance of the resistors 414, 415, 424 and 425 can be set to satisfy this equation as described in the first embodiment.

The present invention is particularly suitable for application to portable devices or the like, and may be applied to any devices to which power is supplied from external sources.

It is apparent that the present invention is not limited to the above embodiment and it may be modified and changed without departing from the scope and spirit of the invention.

What is claimed is:

1. A power supply selection/detection circuit to select one external power supply from a plurality of external power supplies, comprising:

for each of the plurality of external power supplies, a resistance element with one end connected to a respective one of the external power supplies and another end connected to a main power supply line, and a first voltage detector to receive a voltage of the respective external power supply and detect a voltage of the respective external power supply; and for at least one of the plurality of external power supplies, a second voltage detector to detect a voltage between the ends of the resistance element, and a switch connected between the respective external power supply and a ground to short-circuit or open-circuit between the respective external power supply and the ground according to an output of the second voltage detector, wherein the switch has one end connected to a further resistor and is open-circuited if a voltage from the at least one of the plurality of external power supplies exceeds a voltage on the main power supply line and short-circuited if a voltage from the at least one of the plurality of external power supplies is less than a voltage on the main power supply line.

2. The power supply selection/detection circuit according to claim 1, wherein for each of the plurality of external power supplies, the first voltage detector includes a first voltage-dividing resistor and a second voltage-dividing resistor connected to the ground, and resistance of the further resistor connected to the switch is lower than a total of resistance of the first voltage-dividing resistor and the second voltage-dividing resistor.

3. The power supply selection/detection circuit according to claim 2, wherein for each of the plurality of external power supplies, $V/Imax \geq (R1+R2)$ is satisfied when a current limit is Imax, a supply voltage is V, resistance of the first voltage-dividing resistor is R1, and resistance of the second voltage-dividing resistor is R2.

4. The power supply selection/detection circuit according to claim 3, wherein at least one of the plurality of external power supplies is a USB (Universal Serial Bus) interface connector.

5. The power supply selection/detection circuit according to claim 4, wherein the current limit (Imax) of the USB interface connector is 500 μA and the supply voltage (V) of the USB interface connector is 4.3 to 5.4 V, and a total of resistance (R1+R2) of the first voltage-dividing resistor and the second voltage-dividing resistor is 8.6 KΩ or higher.

6. The power supply selection/detection circuit according to claim 1, wherein the resistance element is one selected from a Schottky diode, a resistor, and a transistor.

7. A method of selecting a power supply from a plurality of external power supplies by a detection circuit to supply a voltage to a load through a power supply line, each of the plurality of external power supplies including a first power supply and a second power supply, the detection circuit having a first voltage detector that receives a voltage of the first power supply and detects a voltage of the first power supply, a second voltage detector that receives a voltage of the second power supply and detects a voltage of the second power supply, a first resistance element with one end connected to the first power supply and a second end connected to the power supply line, and a second resistance element with one end connected to the second power supply and a second end connected to the power supply line, the method comprising:

connecting the first power supply to the power supply line to supply a voltage to the load;

monitoring a voltage between the first and second ends of the second resistance element; and connecting the second power supply to a ground when a result of the monitoring indicates that a voltage of the power supply line is less than a voltage of the second power supply.

8. The method of claim 7, wherein the step of connecting the second power supply to ground comprises continuing to connect the first power supply to the power supply line after the result of the monitoring indicates that a voltage of the power supply line is less than a voltage of the second power supply.

* * * * *